United States Patent

Broekhuis et al.

(10) Patent No.: US 6,576,688 B1
(45) Date of Patent: Jun. 10, 2003

(54) WATERBORNE SANITARY CAN COATING COMPOSITIONS

(75) Inventors: Antonius Augustinus Broekhuis, Amsterdam (NL); Petrus Gerardus Kooijmans, Amsterdam (NL); Jan Van Ogtrop, Amsterdam (NL)

(73) Assignee: Shell Oil Company, Houston, TX (US)

( * ) Notice: Subject to any disclaimer, the term of this patent is extended or adjusted under 35 U.S.C. 154(b) by 50 days.

(21) Appl. No.: 09/980,385
(22) PCT Filed: May 30, 2000
(86) PCT No.: PCT/EP00/05007

§ 371 (c)(1),
(2), (4) Date: Nov. 30, 2001

(87) PCT Pub. No.: WO00/75249

PCT Pub. Date: Dec. 14, 2000

(30) Foreign Application Priority Data

Jun. 2, 1999 (EP) .............................. 99201776

(51) Int. Cl.⁷ ................................ C09D 5/44
(52) U.S. Cl. ...................... 523/404; 525/382; 525/228; 204/501
(58) Field of Search .................... 524/592; 523/404, 523/382, 228, 105, 111, 403; 204/401, 502, 507

(56) References Cited

U.S. PATENT DOCUMENTS

| | | | |
|---|---|---|---|
| 3,869,366 A | 3/1975 | Tameyuki et al. | |
| 4,442,244 A | 4/1984 | Johannes et al. | |
| 5,288,822 A | 2/1994 | Goswami et al. | |
| 5,698,663 A | 12/1997 | Kinneberg | |
| 6,309,527 B1 | * 10/2001 | Broekhuis et al. | ........... 204/501 |

FOREIGN PATENT DOCUMENTS

| | | | |
|---|---|---|---|
| EP | 0 913 428 A | 5/1999 | ........... C08L/73/00 |
| WO | 99/48980 | 9/1999 | ........... C08L/73/00 |

* cited by examiner

*Primary Examiner*—Edward J. Cain
*Assistant Examiner*—Katarzyna Wyrozebski Lee
(74) *Attorney, Agent, or Firm*—Y. Grace Tsang

(57) ABSTRACT

Waterborne sanitary can coating composition, derived from at least (a) epoxy resin, derived from phenol derivatives and epichlorohydrin, which has been converted into a cationic $NH_2$ containing form by reaction with amine, an amine adduct or ammonia and subsequently has been converted into corresponding ammonium salt by addition of organic acid, (b) a phenol-formaldehyde resin as curing agent, (c) polyketone resin, having a number average molecular weight $M_n$ of at least 500, and (d) water, containing minor amounts of organic solvents. Coated tin plate coils on which said waterborne sanitary compositions have been applied and coated cans, obtained from the coated tin plate coil.

10 Claims, No Drawings

WATERBORNE SANITARY CAN COATING COMPOSITIONS

The invention relates to waterborne sanitary can coating compositions, to coated cans prepared with them and to a process for their preparation.

More in particular the invention relates to water soluble can coating compositions, derived from combinations of epoxy resins and phenol- or melamine-formaldehyde resins as curing agent.

The rather attractive coating properties of coating films derived from such combinations, such as good chemical resistance, good adhesion and corrosion resistance, are known for a long time already.

Can coating compositions for feed and beverages comprising these combinations were known from e.g. EP 0511223A1; U.S. Pat. No. 4,758,638A; U.S. Pat. No. 4,722,982A; JP 63142068A; JP 6109737A, disclosing organic solvent based can coating systems containing from 30 to 40 wt resin solids but having as main disadvantage in respect of health and environment the evaporation of large amounts of solvents after and/or during application. On the other hand water borne can coating systems were disclosed in e.g. EP 0116225B1; EP 0367493B1; U.S. Pat. No. 5,387,625A; U.S. Pat. No. 4,021,396A; U.S. Pat. No. 4,308,185A; U.S. Pat. No. 4,212,781; U.S. Pat. No. 4,302,373; U.S. Pat. No. 4,413,015; U.S. Pat. No. 4,683,273A; U.S. Pat. No. 4,897,434A; EP 0054290B1; EP 0006334B1, comprising the epoxy resin component incorporated into a prepolymer, bearing a functional group, e.g. carboxyl group, and derived from in addition to the epoxy resin, e.g. acrylic acid or methacrylic acid, and esters of these acids and other vinyl comonomers such as styrene.

The remaining carboxyl groups of the precopolymer are neutralized with amine to form a water soluble or water dispersable precopolymer in the coating composition. However an important disadvantage of said water borne coating compositions was that they were not suitable for internal food can coatings due to their bad sterilization resistance.

Efforts to develop water borne binders for can lacquers through modification of epoxy resins with amino acids were known from e.g. W T Raudenbusch, A Noordam, W J van Westrenen, FATIPEC 1988 (Aachen).

It will be appreciated that there is still a growing need for water borne can coating systems, providing a good combination of coating film properties as obtained earlier with epoxy/phenol formaldehyde resin systems (high performance resins) in combination with a good sterilization resistance, and which does not produce significant amounts of solvents and does not release low molecular toxic epoxy containing compounds during or after curing, due to the increasing pressure of environmental and health authorities (health/environment friendly systems).

It is therefore an object of the present invention to provide said waterborne sanitary can coating compositions, i.e. waterborne can coating compositions for food or beverage cans, which must have sterilization resistance.

Another object of the present invention is to provide a process for the preparation of said waterborne coating compositions.

As a result of extensive research and experimentation said waterborne sanitary can coating compositions aimed at could surprisingly be found.

Accordingly the invention relates to waterborne sanitary can coating compositions derived from at least (a) an epoxy resin, derived from phenol derivatives such as tetraphenylol ethane or para tert.butyl phenol, bisphenol, and epichlorohydrin, which has been converted into a cationic $NH_2$ containing form by reaction with an amine, an amine adduct or ammonia and has been subsequently converted in the corresponding ammonium salt by addition of an organic acid, (b) a phenol-formaldehyde resin, (c) a polyketone resin, having a number average molecular weight Mn of at least 500, and (d) water, containing minor amounts of organic solvents.

Preferably the invention relates to waterborne sanitary can coating compositions wherein the equivalent ratio between the starting epoxy resin and secondary amine is in the range of from 0.9:1 to 1.1:1, and more preferably as close as possible to 1:1, wherein the weight ratio between phenolformaldehyde (b) and epoxy resin (a) is from 10:90 to 35:65, and wherein the equivalent weights of the polyketone resin and primary amine groups, i.e. the amount of polyketone required for formation of one pyrrole ring with one primary amine group, are stoichiometric, and wherein the amount of added organic acid will be sufficient to render the cationic resin water (containing cosolvents) soluble or dispersable to obtain a stable composition.

More preferably the invention relates to waterborne sanitary can coating compositions comprising at least (a) an epoxy resin derived from bisphenol and epichlorohydrin, which is solid at room temperature, has a melting range in the range of from 100 to 150° C., a hydroxyl content of from 3400 to 4000 mmol/kg and preferably from 3400 to 3800 mmol/kg, an epoxy group content (EGC) of from 800 to 250 mmol/kg and an epoxy molar mass (EMM) in the range of from 1290 to 3200 g, and which has been converted into a cationic $NH_2$ containing form by reaction with an amine, an amine adduct or ammonia, and has been subsequently converted in the corresponding ammonium salt by addition of an organic acid, (b) a phenol-formaldehyde resin, (c) a polyketone resin, having a number average molecular weight Mn in the range of from 500 to 10,000, and (d) water, containing minor amounts of organic solvents.

With the term "waterborne sanitary can coating compositions" as used throughout the specification and claims, are meant can coating compositions, which are water soluble or dispersable and which can be successfully used for cans containing food or beverages, which have to be sterilized after packing.

With the term "minor amounts of organic solvents" is meant, that the organic solvents can occur in a proportion of at most 25 wt % and preferably at most 15 wt % relative to the weight of the aqueous solvent.

Such organic solvents may be selected from 2-butoxyethanol-1, butanol, ethanol, propanol, ethylene glycol monoethyl ether, isopropanol, propylene glycol, monomethyl ether, Butyl CELLOSOLVE solvent, Butyl CARBITOL solvent and mixtures thereof (CELLOSOLVE and CARBITOL are trademarks). The use of 2-butoxy ethanol-1 is preferred.

It will be appreciated that in the epoxy resin reaction product (a) must be present at least one primary amino group. Preferably the epoxy reaction product contains no secondary nitrogen groups, and most preferably the majority of the amino groups are primary in the epoxy reaction product (a).

It will be appreciated that the amount of amine source to be used must be at least an amount which is sufficient to render the resin cationic and therefore water soluble or dispersable after neutralization with organic acid and such that after addition of component (c) all amino groups introduced have incorporated in formed pyrrole rings in the cured coating films.

The waterborne sanitary can coating compositions of the present invention preferably comprise a component (c), which has a number average molecular weight of from 1000 to 4000.

More preferably said number average molecular weight of component (c) is in the range of from 1200 to 3000 and most preferably in the range of from 1500 to 2500.

Preferred waterborne sanitary can coating compositions of the present invention can be characterized by an equivalent ratio between the epoxy resin and the secondary amine 0.95:1 to 1.05:1 and more preferably as close as possible to 1:1 and the weight proportions of the components (a) and (b) in the range of from 28:75 to 32:68 and molar proportions of the component (c) and ammonia or amine in the range of from 1:1 to 1:2.

As organic acid can be used for the solubilisation or dispersion of the converted epoxy resin relatively low molecular weight carboxylic acids, such as formic acid, acetic acid, lactic acid, of which lactic acid is preferred.

As component (b) preferably is used a phenol/formaldehyde resin of the resol type, obtainable from phenol or substituted phenol with molar excess formaldehyde under basic reaction conditions.

Commercial representatives of suitable phenol-formaldehyde resins are BAKELITE 100; SANTOLINK EP 560; PHENODUR PR 217; PHENODUR PR 401; PHENODUR PR 285; PHENODUR PR 722; EPIKURE DX-200; UCAR CKS-3892; URAVAR FN-1, FB 110, FB 120, FB 190, FB 209 resins (BAKELITE, SANTOLINK, URAVAR, PHENODUR, UCAR and EPIKURE are trademarks).

Preferably PHENODUR PR 217, PHENODUR PR 285 or EPIKURE DX-200 resins are used as component (b).

Component (a) is preferably selected from solid epoxy resin having an EGC in the range of from 250 to 650 and an EMM in the range of from 1700 to 3100 and a melting range in the area of from 100 to 115° C., which is prereacted with an amine or amine adduct into a cationic $NH_2$ containing form and has been subsequently converted in the corresponding ammonium salt by addition of an organic acid.

The amines are more preferably selected from the group of aliphatic di- or poly-amines of from 2 to 20 carbon atoms inclusive.

Preferred are those amines, having from 2 to 12 amino groups inclusive, at least one of which is primary amino groups, and more preferred are those amines, having from 2 to 6 carbon atoms. More preferably the amines have at least two primary amino groups.

In general, those amines are suitable, which, after reaction with the epoxy resin, are still capable to readily react with the polyketone to form pyrrole rings. More in particular those amines are formed by adducts of a starting amine and a ketone, such as acetone, methylisobutyl ketone, methylpropyl ketone, of which methylisobutyl ketone is preferred.

The starting amines which can be used can be selected from dialkylene triamine (e.g. diethylene triamine; N,N-dimethyldipropylene triamine; ethylenepropylene triamine; dipropylene triamine) or trialkylene tetramine (e.g. triethylene tetramine; N,N'-bis(3-aminopropyl)-ethylene diamine), N-ethyl-1,2-ethane diamine, N-methyl-1,3-propane diamine, N-cyclohexyl-1,3-propane diamine, 2[(2-aminoethyl)amino]ethanol, 1-piperazineethane amine, N(2-aminoethyl)1,3-propane diamine, N(3-aminopropyl)1,3-propane diamine, N,N"-1,2-ethanediylbis-(1,3-propane diamine, N'-(3-aminopropyl), N,N-dimethyl-1,3-propane diamine.

It will be appreciated that, if desired, mono secondary amines can be used as end capping agent for remaining epoxy groups in initially prepared amine derivatives of starting epoxy resins. Such end capping agents can be selected from diethyl amine, dimethyl amine or other mono secondary amines.

It will be appreciated, that other aspects of the present invention are formed by coated tin plate coil, obtainable by application of the hereinbefore specified waterborne coating compositions by spraying or roller coating, and by coated sanitary cans for sterilised food or beverages, obtained from coated tin plate coil.

It has been found that attractive properties of the aqueous can coating compositions can only be reached, if a prereaction occurs between the starting epoxy resin and the amine, amine adduct or ammonia.

Therefore another aspect of the present invention is formed by a process for the preparation of waterborne sanitary can coating compositions comprising:

(i) the reaction of an epoxy resin with an amine, amine adduct or ammonia to form a cationic $NH_2$ containing epoxy resin, (ii) reaction of the cationic $NH_2$ containing epoxy resin and an organic acid in water to form a water soluble or dispersable resin, (iii) addition of the phenol-formaldehyde resin and the polyketone resin to the water soluble or dispersable resin.

The invention is illustrated by the following examples, however without restricting its scope to these embodiments.

The following Evaluation Methods have been used in these examples.

| | |
|---|---|
| Application and Stoving: | All coatings were applied with bar coater #3 on tinplate substrates (E2 type). The films were stoved for 10 minutes at 200° C. |
| Dry film thickness: | International Standards (ISO) 2808-1974/2178-1982. |
| Solvent resistance: | A piece of cotton wool is impregnated with MEK and is rubbed over the coating with a manual power of 2 kg. The number of double rubs required to remove the film down to bare metal is measured. A film with a MEK resistance higher than 100 is regarded as very well cured, whereas a MEK resistance under 10 indicates a low cure. |
| Flexibility: | Wedge-bend test; a coated panel of 100 mm by 50 mm is bent over a 6 mm cylindrical mandrel. The folded panel thus produced is then impacted (4.5 Nm or 45 kg.cm) in a device (the wedge-bend tester) to form a wedge-shaped contour, flat at one end and 6 mm diameter at the other end. Before the impact it is required to place the bent panel so that the point of impact which gives the panel a 0 mm bend is about 2 mm from the panel edge. This allows the zero point to be more accurately determined. The panel is immersed in an acidified copper sulphate solution. The flexibility is assessed by measuring the continuous damage caused by the impact. Quantification of the damage: a) Continuous damage to say 20 mm. After that no or only isolated damaged areas. Notation: WB = 20. b) Continuous damage to say 20 mm, alternate damaged and undamaged sections to say 35 mm, followed by no or only isolated damage. Notation: WB = 20 (35). c) Much local damage, but no continuous damage to say 25 mm. Notation: WB = (25). |

| Sterilisation resistance: | The coated panels are immersed in a reagent for 90 min. at 130° C. The typical reagents are tap water, 0.5, 1% and 2% lactic acid solution. After pasteurisation the panels are evaluated by comparing them visually with standards. The evaluation range goes from 0 to +5 (0 = very heavy blushing; 5 = no blushing). |
|---|---|

EXAMPLE 1

(a) A glass reactor fitted with a stirrer, thermocouple and reflux condenser is charged with 61.9 parts of EPIKOTE 1007 (EPIKOTE is a trademark) and 70 parts of methyl isobutyl ketone (MIBK). This mixture is heated to 60° C. and stirred until the EPIKOTE is completely dissolved in the methyl isobutyl ketone. Then 8.1 parts of EPIKURE H1 (trademark for adduct of diethylenetriamine (DETA) and MIBK) is added and the mixture is brought to reflux temperature and stirred for three hours. The mixture is cooled to 50° C. and 30 parts 2-butoxy ethanol-1 is added. Methyl isobutyl ketone is removed by distillation leaving a 70% solution of cationic epoxy binder in 2-butoxy ethanol-1.

(b) A glass reactor fitted with a stirrer, thermocouple and reflux condenser is charged with 100 parts of the resulting resin of step (a) and heated to 65° C. Then 6.1 parts of lactic acid (90% solids in water) and 50 parts demineralised water are added gradually and slowly over a period of one hour. This results in a stable solution of cationic epoxy binder in water.

(c) After cooling down the solution to room temperature 40.8 parts of PHENODUR PR 217 (65% solids in butanol) and subsequently 11.2 parts of polyketone resin of a Mn=1950 are added under stirring until a homogenous emulsion is formed. Then about 160 g of demineralised water is added to obtain a solids content of 62% and a viscosity of about 1 Poise.

Preparation of comparatives A, B, C

Comparative A 100 parts of the 70% cationic epoxy resin is heated to 65° C. Then 6.1 parts of lactic acid (90% solids in water) is added at once. After homogeneous 50 parts demineralised water is added gradually over a period of one hour. After cooling down to room temperature 40.8 parts of PHENODUR PR 217 (65% solids in butanol) is added. Finally after homogeneous demineralised water is added until a viscosity of about 1 Poise is reached. This requires about 135 g.

Comparative B 100 parts of the 70% cationic epoxy resin is heated to 65° C. Then 6.1 parts of lactic acid (90% solids in water) is added at once. After homogeneous 50 parts demineralised water is added gradually over a period of one hour. After cooling down to room temperature 11.2 parts of polyketone resin of a Mn=1950 is added. Finally after homogeneous demineralised water is added until a viscosity of about 1 Poise is reached. This requires about 110 g.

Comparative C

To 70 parts of EPIKOTE 1007 resin, 173 parts of a solvent blend consisting of propylene glycol monomethyl ether (MePROX) and Shell Solvent A (SSA), ratio 2/1, is added. This mixture is heated to 50° C. and kept at this temperature until homogeneous. After cooling down to room temperature 43.8 parts of PHENODUR PR 217 (65% solids in butanol) and 3.5 parts of a 10% phosphoric acid solution in MePROX are added.

TABLE 1

Lacquer composition

| Lacquer no. | Ex. 1 | Comp. A | Comp. B | Comp. C |
|---|---|---|---|---|
| EPIKOTE 1007 (29% in MePROX/SSA) | — | — | — | 243 |
| Cationic epoxy binder ex. 1 (70% in 2-butoxy ethanol) | 100 | 100 | 100 | — |
| PHEHODUR PR 217 (65% in butanol) | 40.8 | 40.8 | — | 43.8 |
| Polyketone resin | 11.2 | — | 11.2 | — |
| Lactic acid (90% in water) | 6.1 | 6.1 | 6.1 | — |
| $H_3PO_4$ (10% in MePROX) | — | — | — | 3.5 |
| Demineralised water | 210 | 185 | 160 | — |

TABLE 2

Formulation details

| Lacquer | Ex. 1 | Comp. A | Comp. B | Comp. C |
|---|---|---|---|---|
| Viscosity (Poise) | ~1 | ~1 | ~1 | ~1 |
| Degree of neutralisation | 0.67 | 0.67 | 0.67 | — |
| EPIKOTE/PF* (m/m) | — | — | — | 70/28.5 |
| Cationic epoxy binder/PF* (m/m) | 70/28.5 | 70/28.5 | — | — |
| $NH_2$/polyketone (eq. Ratio)** | 1/1 | — | 1/1 | — |
| Organic solvent (% m) | 13 | 15 | 13 | 65 |
| Water (% m) | 57 | 56 | 58 | 0 |

*PF = Phenol Formaldehyde.
**Amount of polyketone required to form one pyrrole ring with a $NH_2$ group.

TABLE 3

Film properties*

| Lacquer | Ex. 1 | Comp. A | Comp. B | Comp. C |
|---|---|---|---|---|
| Solvent resistance** | >50 | >50 | 20–30 | >50 |
| Flexibility** | 20–35 | 25–35 | 40–55 | 20–35 |
| Sterilisation resistance** | 5 | 4 | 2 | 5 |
| water | 5 | 0 | 0 | 5 |
| lactic acid 2% | | | | |

*All coatings were applied with bar coater #3 on tinplate substrates (E2 type). The films were stoved for 10 minutes at 200° C. The dry film thickness of the films is about 5–8 μm (measured according to International Standards 2808-1974/2178-1982).
**See appendix 1 for description of the evaluation methods.

EXAMPLE 2

A glass reactor equipped with anchor type stirrer, thermocouple and reflux condenser is charged with 615 parts Epoxy-DPP-Novolac resin and 352 parts of nonylphenol. This mixture is heated to 140° C. and at about 90° C. a homogenous melt is formed. Then 0.48 parts of tetra-methyl-ammonium-chloride (50% solids in water) is added.

The mass is kept at 140° C. for about 1–2 hours. Then after slight cooling 483.02 parts of 2-butoxy ethanol is added to obtain a 66.7% m/m solution. The resulting resin is homogenised with 708 parts of EPIKOTE 1001 resin and 634.5 parts of 2-butoxy ethanol by heating to about 90° C. After cooling to 25° C., 408 parts of ammonia (25% solids in water) and 772.5 parts of a solvent blend consisting of tetrahydrofuran and ethanol (4/1) are added to obtain a clear homogeneous product. Then the temperature of the mass is increased gradually to about 60° C. and kept at this temperature for about 6 hours. Thereafter the temperature is raised as quick as possible to 120° C. and the excess ammonia and solvents are removed by destination and nitrogen purge in the mass. This results in a 60% solution of epoxy/$NH_3$ adduct in 2-butoxy ethanol.

To 100 parts of the epoxy/$NH_3$ adduct (60% solids in 2-butoxy ethanol), 6.4 parts of lactic acid (90% solids in water), 37.6 parts of PHENODUR resin (65% solids in butanol) and 6.7 parts of polyketone resin of Mn=2100 are added at room temperature. When homogenous the mixture is diluted with water until a viscosity of about 1 Poise is reached. This requires about 180 g.

Preparation of Comparative D

To 100 parts of the epoxy/$NH_3$ adduct (60% solids in 2-butoxy ethanol), 6.4 parts of lactic acid (90% in water) and 37.6 parts of PHENODUR PR 217 (65% solids in butanol) are added at room temperature. When homogenous the mixture is diluted with water until a viscosity of about 1 Poise is reached. This requires about 160 g.

TABLE 4

| Lacquer composition | | |
| --- | --- | --- |
| Lacquer no. | Ex. 2 | Comp. D |
| Epoxy-$NH_3$ adduct (60% in 2-butoxy ethanol) | 100 | 100 |
| PHENODUR PR 217 (65% in butanol) | 37.6 | 37.6 |
| Polyketone resin | 6.7 | — |
| Lactic acid (90% in water) | 6.4 | 6.4 |
| Demineralised water | 180 | 160 |

TABLE 5

| Formulation details | | |
| --- | --- | --- |
| Lacquer | Ex. 2 | Comp. D |
| Viscosity (Poise) | ~1 | ~1 |
| Degree of neutralisation | 0.67 | 0.67 |
| Epoxy-$NH_3$ adduct/PF* (m/m) | 70/28.5 | 70/28.5 |
| $NH_2$/polyketone (eq. Ratio)** | 1/1 | — |
| Organic solvent (% m) | 16 | 17 |
| Water (% m) | 55 | 53 |

*PF = Phenol Formaldehyde
**See footnote table 2.

TABLE 6

| Film properties* | | |
| --- | --- | --- |
| Lacquer | Ex. 2 | Comp. D |
| Solvent resistance** | >50 | >50 |
| Flexibility** | 30–35 | 40–45 |
| Sterilisation resistance** | 5 | 3 |

TABLE 6-continued

| Film properties* | | |
| --- | --- | --- |
| Lacquer | Ex. 2 | Comp. D |
| water lactic acid 2% | 3–4 | 1 |

*All coatings were applied with bar coater #3 on tinplate substrates (E2 type). The films were stoved for 10 minutes at 200° C. The dry film thickness of the films is about 5–8 μm (measured according to International Standards 2808-1974/2178-1982).
**See appendix 1 for description of the evaluation methods.

What is claimed is:

1. Waterborne sanitary can coating compositions, made from a composition comprising at least:
   (a) an ammonium salt of an epoxy resin, prepared by:
      (i) reacting phenol compound and epichlorohydrin,
      (ii) converting the product from (i) into a cationic $NH_2$ containing form by reaction with an amine, an amine adduct or ammonia, and
      (iii) converting the product from (ii) above into the corresponding said ammonium salt of the epoxy resin by addition of an organic acid,
   (b) a phenol-formaldehyde resin,
   (c) a polyketone resin, having a number average molecular weight Mn of at least 500, and
   (d) a mixture comprising a major amount of water and a minor amount of organic solvent(s).

2. The waterborne sanitary can coating compositions according to claim 1, wherein the equivalent ratio between epoxy resin and secondary amine is in the range of from 0.9:1 to 1.1:1, and wherein the weight ratio between phenol-formaldehyde and epoxy resin is from 10:90 to 35.

3. A waterborne sanitary can coating compositions comprising at least
   (a) an epoxy resin made derived from bisphenol and epichlorohydrin, which is solid at room temperature, having a melting range in the range of from 100 to 150° C., a hydroxyl content of from 3400 to 4000 mmol/kg, an epoxy group content (EGC) of from 800 to 250 mmol/kg and an epoxy molar mass (EMM) in the range of from 1290 to 3200 g, and which has been converted into a cationic $NH_2$ containing form by reaction with an amine, amine adduct or ammonia and which subsequently has been converted into the corresponding ammonium salt by addition of an organic acid,
   (b) a phenol-formaldehyde resin,
   (c) a polyketone resin, having a number average molecular weight Mn in the range of from 500 to 10,000, and
   (d) a mixture comprising water and at most 25 wt % of organic solvents.

4. The waterborne sanitary can coating compositions according to claim 1, wherein component (c) has a number average molecular weight of from 1500 to 2500.

5. The waterborne sanitary can coating compositions according to claim 1, wherein lactic acid is used for the solubilization of the converted epoxy resin.

6. The waterborne sanitary can coating compositions according to claim 1, wherein a phenol/formaldehyde resin used is of the resol resin obtained from phenol or phenolic compound with excess formaldehyde under basic reaction conditions.

7. The waterborne sanitary can coating compositions according to claim 1 wherein component (a) is made from a solid epoxy resin, having an epoxy group content the range of from 250 to 650 and an epoxy molar mass in the range of from 1700 to 3100 and a melting range in the area of from 100 to 115° C.

8. A coated tin plate coil, obtained by application of the waterborne can coating compositions according to claim 1 by spraying or roller coating.

9. A coated can for sterilized food or beverages, obtained from coated tin plate oil according to claim 8.

10. A process for the preparation of waterborne sanitary can coating compositions comprising the steps of:

(i) the reaction of an epoxy resin with an amine, amine adduct or ammonia for form an anionic $NH_2$ containing epoxy resin, (ii) the reaction of the cationic $NH_2$ containing epoxy resin and an organic acid in water to form a water soluble or dispersable resin, and (iii) the addition of a phenol-formaldehyde and a polyketone resin, having a number average molecular weight Mn of at least 500, to the water soluble or dispersable resin.

* * * * *